Nov. 25, 1952          P. I. HENDERSON          2,619,047

APPARATUS FOR MAKING ICE-CREAM CONES

Filed March 14, 1950          2 SHEETS—SHEET 1

PORTER I. HENDERSON,
INVENTOR.

BY Eaton + Bell

ATTORNEYS

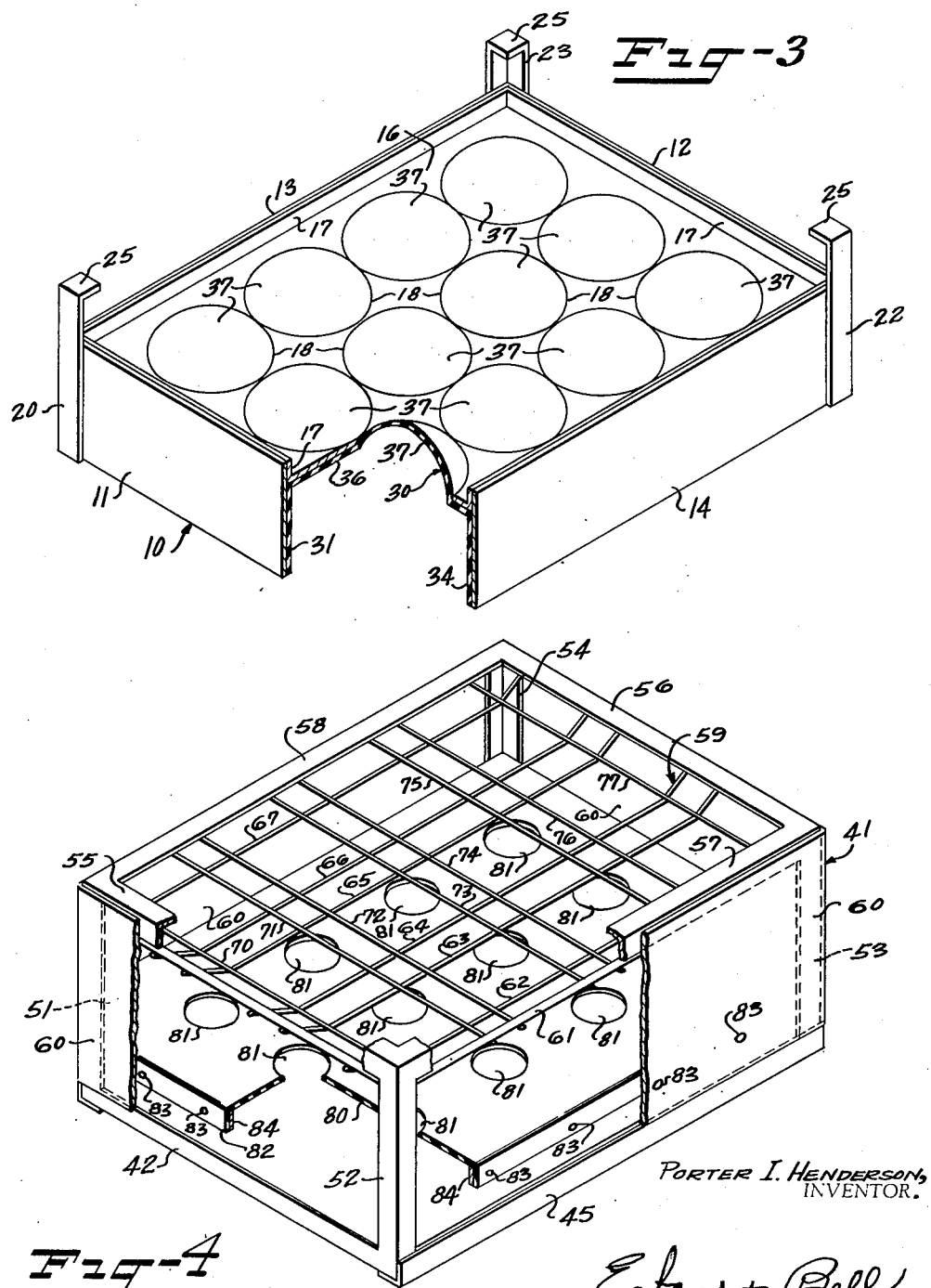

Patented Nov. 25, 1952

2,619,047

UNITED STATES PATENT OFFICE 2,619,047

APPARATUS FOR MAKING ICE-CREAM CONES

Porter I. Henderson, Charlotte, N. C.

Application March 14, 1950, Serial No. 149,583

5 Claims. (Cl. 107—8)

This invention relates to improvements in the art of making frozen confections and more especially to a mold adapted to receive a freezable confection in liquid or pliable form preparatory to moving the mold through a refrigerant for forming the freezable confection in a predetermined shape, and to also provide a rack having means for supporting a plurality of edible cones in an inverted position on the mold, as the mold is moved through the refrigerant, to form filled ice cream cones or the like.

Heretofore, various attempts have been made to manufacture pre-filled ice cream cones preparatory to marketing the same in this filled condition. However, none of these attempts have proved successful in that the contents of a pre-filled cone have not retained the appearance nor the taste of a cone which was filled to order.

It is, therefore, an object of this invention to provide an apparatus for making ice cream cones in quantity in such a manner that the contents of the cones may be frozen while partially encased by the cones and then packaged to be later sold as packaged.

It is another object of this invention to provide a mold having a plurality of cavities of predetermined shape therein which are adapted to receive a mass of ice cream or other confection in liquid or pliable form and to also provide a rack having means thereon for supporting a plurality of inverted empty edible cones in spaced relation to each other and the cones being so positioned as to aline with the cavities in the mold when the rack is placed in position on the mold. Inasmuch as the cones are supported in the rack, the supporting means of the rack is so positioned that the cones may engage and partially encase the contents of each of the cavities, but, on the other hand, the supporting means will prevent the cones from moving further than desired, by gravity, into the corresponding cavities, the supporting means also serving to hold the cones in proper axial alinement with the cavities in the mold.

It is still another object of this invention to provide a mold of the type described wherein the mold is provided with a bottom having cavities or compartments, said compartments being formed of a resilient material and the bottom being provided with supporting means for supporting the same in such a manner that the compartments thereof will not engage any object on which the mold may be placed during its passage through a refrigerant and whereby the ice cream or the like thus formed in each compartment may be easily removed therefrom by merely partially collapsing the compartments and thus eliminating the necessity of applying heat to the mold.

It is still another object of this invention to provide a rack for supporting edible cones in an inverted position and which is adapted to be used in conjunction with a mold of the type heretofore described, the rack being provided with supporting means for the cones comprising a sheet of resilient material, such as rubber and the like, provided with a plurality of openings of the same configuration as the cross-sectional shape of the edible cones and said rack also being provided with a second supporting means spaced substantially from the sheet of resilient material and including a plurality of spaced members, these spaced members forming openings in axial alinement with the openings in the sheet of resilient material so that cones may be placed in the openings in the resilient material and may also extend through the openings formed by the spaced members, the resilient material serving to frictionally hold the cones in the rack and the spaced members serving to hold the cones in proper axial alinement with the openings in the resilient sheet as well as holding the cones in axial alinement with the compartments in the mold, so the confection, upon being passed through the refrigerant, may be frozen integral with the cones so positioned.

Some of the objects of the invention having been stated, other objects will appear as the description proceeds, when taken in connection with the accompanying drawings, in which—

Figure 3 is an isometric view looking up at the bottom of the mold shown in Figures 1 and 2 and showing one corner thereof broken away and being partly in section;

Figure 4 is an isometric view looking up at the bottom of the cone-holding rack shown in Figures 1 and 2 and showing the rack disassociated from the mold with parts broken away and showing some of the parts in section.

Figure 1:
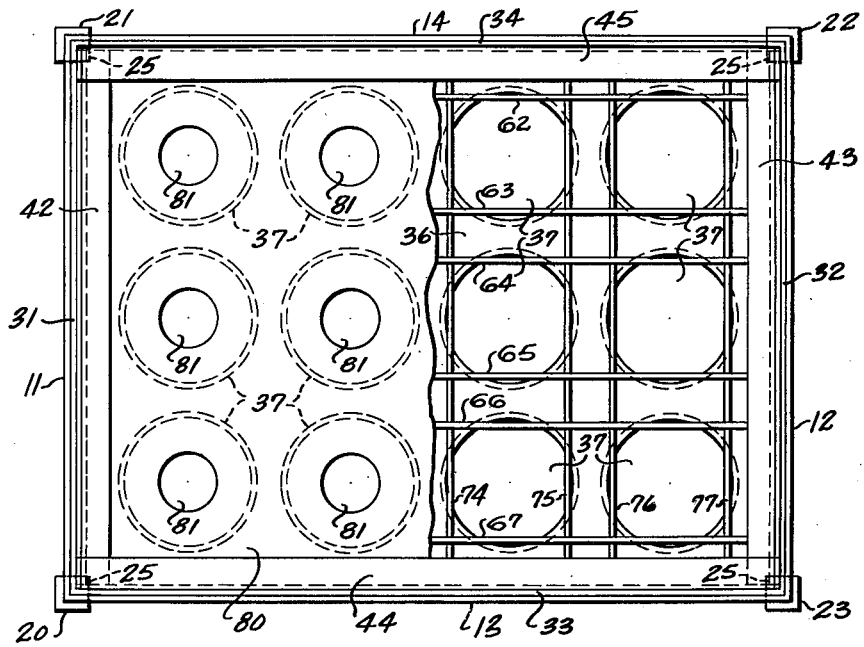
Figure 1 is a top plan view of the apparatus showing the rack in association with the mold and with a part of the rack being broken away for purposes of clarity.

Referring more specifically to the drawings, the numeral 10 broadly designates a mold for forming a pliable confection, such as the ice cream portion of an ice cream cone into a desired shape, said mold shown as being substantially rectangular, but it being understood that any shape or size of mold may be used. The mold 10 comprises rigid end walls 11 and 12 and rigid side walls 13 and 14. The proximate ends of the end walls and side walls are secured to each other in any suitable manner such as by welding. A bottom member 16 having a flange 17 therearound is suitably secured, as by welding, to the lowermost portion of the walls 11 to 14, inclusive, in such a manner that the lowermost edge of the flange 17 is in the same horizontal plane as the lowermost edges of the walls 11 to 14, inclusive.

The bottom member 16 has a plurality of openings 18 therein, these openings preferably being circular and each of said circular openings being of a slightly larger diameter than that of the large end of an ice cream cone.

Suitable corner posts or legs 20, 21, 22 and 23, preferably L-shaped in cross-section, are suitably secured to the respective corners of the mold 10. The posts 20 to 23, inclusive, extend beyond the lowermost surface of the walls 11 to 13, inclusive (Figure 2), and each is provided with a flanged portion 25 to support the mold 10. Further, the legs 20 to 23, inclusive, are adapted to rest on suitable rails or the like, not shown, so the mold 10 may be moved through a tank of brine or other refrigerant to freeze the contents of the mold 10. If desired the mold may be placed in a suitable freezing chamber to freeze the contents thereof.

Figure 2:
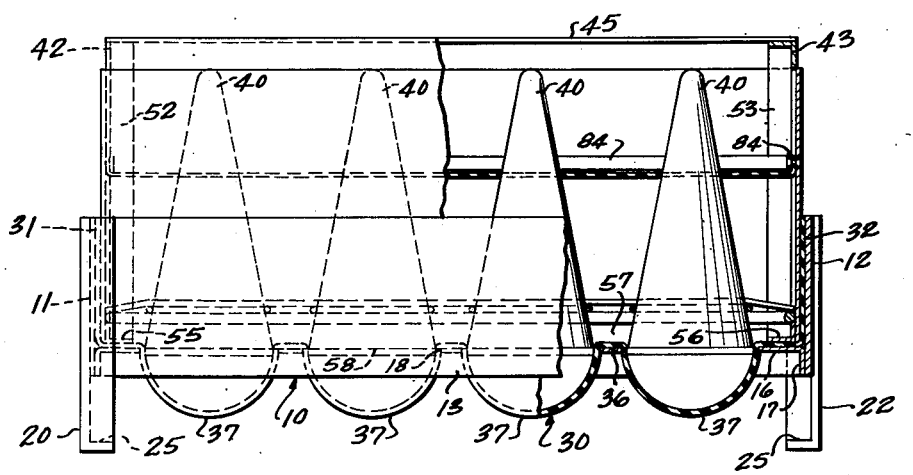
Figure 2 is a front elevation of the structure shown in Figure 1 with parts being broken away, and showing some of the parts in section.

A resilient insert, preferably molded as a single unit from rubber or any other resilient material and broadly designated at 30, is adapted to fit within the mold 10. The insert 30 has end walls 31 and 32 and side walls 33 and 34 adapted to slidably engage the respective end walls 11 and 12 and side walls 13 and 14 of the mold 10. The insert 30 is also provided with a bottom 36 having a plurality of spaced concavo-convex cavities or compartments 37 therein, each of the compartments 37 being adapted to fit within the circular openings 18 in the bottom 16 of the mold 10. It is evident that the edible cones may be pyramidal in shape and the configuration of the openings 18 and the compartments 37 may vary accordingly, the cones being conical, the openings 18 being circular and the compartments 37 being hemispherical in the drawings by way of illustration only. It is thus seen that with the insert 30 in position within the mold 10 as shown in Figures 1, 2 and 3, a confection in a liquid or pliable state, such as ice cream, may be placed in the mold to fill each of the compartments 37, at which time a plurality of edible cones 40 may be placed with their open ends facing downwardly so that they will rest in the compartments 37 in engagement with the ice cream, not shown.

Now to further facilitate the placing of the cones 40 in the position described, there is provided a rack broadly designated at 41 which is, preferably, substantially rectangular in shape and of dimensions slightly less than the interior dimensions of the mold 10 so as to permit the rack 41 to be slidably inserted within the confines of the walls of the resilient insert 30 in the mold 10. The rack 41 is shown in normal operating position in Figure 2 and is shown inverted in Figure 4. The rack 41 comprises top frame members such as angle bars 42, 43, 44 and 45 suitably secured to each other at their ends as by welding. A plurality of corner posts 51, 52, 53 and 54 have their uppermost ends suitably secured, as by welding, to the corners of the frame formed by the members 42 to 45, inclusive. The posts 51 to 54, inclusive, extend downwardly in Figure 2, and have their other ends secured, as by welding, to the lower frame portion comprising end members 55 and 56 and side members 57 and 58, such as angle bars, and which have their adjacent ends secured to each other in any suitable manner such as by welding. A wall 60 extends around the entire outer periphery of the rack 41 and is suitably secured to the posts 51 to 54, inclusive, and, if desired, may also be secured to the upper and lower frame members.

The rack 41 and the mold 10 as shown will accommodate a dozen cones, it being understood however that any number of cones may be used by enlarging the size of the mold and rack as desired.

Now, referring to Figure 4, there will be observed a grid broadly designated at 59 and comprising a wire frame 61 substantially rectangular in plan secured to the inner surfaces of the posts 51 to 54, by any suitable means such as welding, and this frame 61 has opposed ends of a plurality of spaced longitudinally extending wires 62, 63, 64, 65, 66 and 67 secured thereto by any suitable means such as welding. A plurality of transverse wires 70, 71, 72, 73, 74, 75, 76 and 77 are secured at their ends to the wire 61 and are also secured to the longitudinally extending wires 62 to 67, inclusive, where they cross the same. It is thus seen that the wires 62 to 67, inclusive, and 70 to 77, inclusive, together with the wire frame 61 form the grid 59 adjacent the lower surface of the rack 41 in Figure 2, or the upper surface thereof in Figure 4.

The wire grid 59 has the longitudinally extending and transverse wires 62 to 67 and 70 to 77, respectively, spaced apart from each other in such a manner as to provide a guiding means adjacent the large ends of the cones 40 as they are placed in the position shown in Figure 2. However, in order to support the cones 40 adjacent the small ends thereof and to prevent the cones from moving downwardly, by gravity, into the compartments 37 beyond a predetermined point, upon the rack 31 being placed in the mold 10, there is provided a partition or support plate 80 which is made of a resilient material such as rubber or the like, and having a plurality of spaced openings 81 therein. This partition 80 is spaced substantially from the grid 59 and, with the rack 41 in the position shown in Figure 4, the cones 40 are placed in the rack 41 with the small ends thereof projecting through the openings 81. Now, when the cones 40 are placed in the rack 41, they are pushed inwardly to where the walls of the openings 81 will frictionally engage the cones 41 and will, upon the tray being positioned as shown in Figure 2, prevent the cones from falling out of the rack 41.

The partition 80 is flanged, as at 82, and is clampingly secured to the inner surfaces of the wall 60 by any suitable means such as rivets 83 which extend through the flanged portion 82 of the partition 80 as well as reinforcing bars 84, the bars 84 engaging the inner surfaces of the flange 82 to assist in supporting the partition 80.

It is thus seen that a plurality of cones 40 may be inserted through the openings provided therefor between the wires 62 to 67 and 70 to 77 of the grid 59 and may partially extend through the openings 81 in the partition 80 so that the partition 80 will thus frictionally hold the cones 40 in the rack 41. The rack 41 may then be inverted or placed in the position shown in Figure 2 in the mold 10 with the frame members 55 to 58, inclusive, resting on the resilient insert 30.

Of course, it is evident that a suitable confection in liquid or pliable form may be poured or otherwise directed into the compartments 37 in the resilient insert 30 of the mold 10, before the rack 41 is placed in the mold 10. It will be observed in Figure 2 that the wire frame 61 is spaced substantially from the lower surfaces of the frame members 55 to 58, inclusive, so as to prevent an over-flow of the confection, such as ice cream, in the compartments 37 from touching the wire frame 61.

The grid 59 and the partition 80 are preferably positioned as shown in Figure 2 so the lower or large ends of the edible cones 40 will project a relatively short distance into the compartments 37 and will thus partially encase the liquid or pliable confection disposed within the compartments 37. The legs 20 to 23, inclusive, of the mold 10 are of sufficient length so that they may be placed on a table or rails or any suitable conveying means without the lower surfaces of the compartments 37 engaging the surfaces on which the legs 20 to 23 are placed. The mold 10 with the rack 41 may then be passed through a suitable refrigerant, such as brine or the like, or may be placed in a refrigerator, so as to freeze the contents of the compartments 37. This will cause the contents of the compartments 37 to also freeze in engagement with the large ends of the cones 40 and will thus cause the cones 40 to adhere to the frozen confection.

After the mold 10 and the rack 41 have passed through the refrigerator, the rack 41 and the mold 10 may then be inverted simultaneously and an operator may partially collapse each of the compartments 37 and remove or lift the mold 10 out of the rack 41.

Since the cones 40 are relatively light, it is then merely necessary for an operator to lift the cones 40 with the ice cream or other confection therein out of the rack 41 since the walls of the openings 81 in the partition 80 will not adhere to the cones 40 sufficiently tight to resist the cones 40 being lifted out of the rack 41. The ice cream cones in this condition are then placed in suitable trays, not shown, and are then suitably packaged for sale. The manner of packaging is not a part of the present invention and a description thereof is deemed unnecessary.

In the drawings and specification there has been set forth a preferred embodiment of the invention and, although specific terms are employed, they are used in a generic and descriptive sense only and not for purposes of limitation, the scope of the invention being defined in the claims.

I claim:

1. Apparatus for forming frozen confections comprising an open-topped mold, a resilient insert adapted to be inserted in the mold, said resilient insert having a plurality of open-topped compartments therein for reception of a freezable confection, a rack adapted to fit within the confines of the mold and support means on the rack having means for holding the ends of a plurality of inverted edible cones, said holding means being in alignment with the compartments in a plane parallel to the plane of the compartments and holding the cones and in such a manner as to project the cones partially into said compartments so as to partially encase the contents thereof whereby, upon the contents of the compartments in the mold being frozen, the mold with the rack may be inverted and an operator may partially collapse the compartments to assist in separating the mold from the contents of each of the compartments as the mold is lifted off of said rack.

2. Apparatus for forming frozen confections comprising an open-topped mold, a resilient insert adapted to be inserted in the mold, said resilient insert having a plurality of open-topped compartments therein for reception of a freezable confection, a rack adapted to fit within the confines of the mold and means on the rack for supporting a plurality of inverted edible cones in alignment with the compartments and in such a manner as to project the cones partially into said compartments so as to partially encase the contents thereof whereby, upon the contents of the compartments in the mold being frozen, the mold with the rack may be inverted and an operator may partially collapse the compartments to assist in separating the mold from the contents of each of the compartments as the mold is lifted off of said rack, said means for supporting the cones in said rack comprising a resilient partition supported intermediate the ends of said rack in a plane parallel to the plane of the open-topped compartments and having a plurality of spaced openings therein in alignment with the openings in the compartments whereby the edible cones may be inserted in spaced openings and the walls of the openings will frictionally engage and support the weight of the cones as the rack is inverted in being placed in the mold.

3. Apparatus for forming frozen confections comprising an open-topped mold, a resilient insert adapted to be inserted in the mold, said resilient insert having a plurality of open-topped compartments therein for reception of a freezable confection, a rack adapted to fit within the confines of the mold and means on the rack for supporting a plurality of inverted edible cones in alignment with the compartments and in such a manner as to project the cones partially into said compartments so as to partially encase the contents thereof whereby, upon the contents of the compartments in the mold being frozen, the mold with the rack may be inverted and an operator may partially collapse the compartments to assist in separating the mold from the contents of each of the compartments as the mold is lifted off of said rack, said means for supporting the cones in the rack comprising a resilient partition disposed in a plane parallel to the open-topped compartments, said partition having a plurality of openings therein aligned with the openings in the compartments and adapted to frictionally support the weight of the cones and a grid spaced between the partition and the insert and having openings therein in alignment with the openings in said partition so as to hold the cones in proper alignment with the compartments in said molds.

4. Apparatus for forming frozen confections comprising an open-topped mold, a resilient insert adapted to be inserted in the mold, said resilient insert having a plurality of open-topped compartments therein for reception of a freezable confection, a rack adapted to fit within the confines of the mold and means on the rack for supporting a plurality of inverted edible cones in alignment with the compartments and in such a manner as to project the cones partially into said compartments so as to partially encase the contents thereof whereby, upon the contents of the compartments in the mold being frozen, the mold with the rack may be inverted and an operator may partially collapse the compartments to assist in separating the mold from the contents of each of the compartments as the mold is lifted off of said rack, said means for supporting the cones in the rack comprising a resilient partition disposed in a plane parallel to said open-topped compartments, said partition having a plurality of openings therein in alignment with the openings of the compartments and adapted to frictionally support the weight of the cones and said rack being provided with a second supporting means spaced between the resilient partition and the mold and including a plurality of spaced members, these spaced members defining openings in alignment with the openings in the partition so that edible cones may be placed in the openings in the resilient partition and may also extend through the openings defined by the spaced members.

5. Apparatus for making frozen confections comprising a rigid mold having a plurality of circular openings therein, a resilient sheet member having a plurality of semi-spherical open-topped compartments therein, said compartments projecting through the openings in said rigid mold and being adapted to receive a pliable or liquid confection, a rack adapted to fit in said mold, a resilient partition in said rack disposed in a plane parallel to the plane of said open-topped compartments and having a plurality of openings therein in alignment with the openings of the compartments, the edges of said openings frictionally engaging the small ends of a plurality of edible cones so the large ends thereof will, upon the rack being placed in the mold, be disposed partially within the compartments of the mold so as to partially encircle the contents thereof to permit the contents of the compartments to be frozen integral with the cones after which the mold may be removed from the rack and from the ice cream cones thus formed by partially collapsing the resilient compartments of the mold.

PORTER I. HENDERSON.

REFERENCES CITED

The following references are of record in the file of this patent:

UNITED STATES PATENTS

| Number | Name | Date |
|---|---|---|
| 718,124 | Heydt | Jan. 13, 1903 |
| 1,007,670 | Broadhead | Nov. 7, 1911 |
| 1,531,504 | Roberts | Mar. 31, 1925 |
| 1,734,765 | Epperson | Nov. 5, 1929 |
| 2,106,893 | Krein | Feb. 1, 1938 |
| 2,155,445 | Pittenger et al. | Apr. 25, 1939 |
| 2,204,495 | Hogue | June 11, 1940 |
| 2,213,902 | Daniels | Sept. 3, 1940 |
| 2,366,941 | Taylor | Jan. 9, 1945 |
| 2,448,786 | Faxon | Sept. 7, 1948 |